United States Patent
Best et al.

(10) Patent No.: US 6,379,724 B1
(45) Date of Patent: Apr. 30, 2002

(54) SLOW MELTING COATING FOR ICE CONFECTIONS

(75) Inventors: Eric Thomas Best, Dublin; Linda Coulter, Cleveland Heights, both of OH (US); Julia Ellen Erickson Decruz, Corvallis, OR (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/425,045

(22) Filed: Oct. 22, 1999

(51) Int. Cl.$^7$ .................................................. A23G 9/00
(52) U.S. Cl. ........................ 426/68; 426/100; 426/101; 426/104; 426/577
(58) Field of Search ................................ 426/101, 577, 426/68, 100, 104

(56) References Cited

U.S. PATENT DOCUMENTS

| | | | |
|---|---|---|---|
| 1,949,657 A | * 3/1934 | Preston | |
| 1,997,616 A | * 4/1935 | Wallerstein et al. | |
| 2,059,541 A | * 11/1936 | Thompson et al. | |
| 2,191,352 A | 2/1940 | Oprean | 99/134 |
| 2,360,559 A | 10/1944 | Glazer | 99/136 |
| 2,701,767 A | * 2/1955 | Twieg et al. | |
| 2,801,922 A | * 8/1957 | Oprean | |
| 2,809,894 A | * 10/1957 | Poarch et al. | |
| 2,878,127 A | * 3/1959 | Forkner | |
| 2,910,365 A | * 10/1959 | Olliver | |
| 3,367,784 A | * 2/1968 | Waitman et al. | |
| 3,752,678 A | 8/1973 | Jenkinson et al. | 99/136 |
| 3,892,870 A | * 7/1975 | Wood | |
| 4,140,807 A | * 2/1979 | Braverman | |
| 4,190,676 A | * 2/1980 | Goringer et al. | |
| 4,268,533 A | * 5/1981 | Williams et al. | |
| 4,985,263 A | 1/1991 | Klug et al. | 426/302 |
| 5,256,426 A | * 10/1993 | Tomioka et al. | |
| 5,306,519 A | 4/1994 | Peterson et al. | 426/658 |
| 6,083,546 A | * 7/2000 | Carrick et al. | |

FOREIGN PATENT DOCUMENTS

| | | |
|---|---|---|
| EP | 0 429 817 | 6/1991 |
| EP | 0 500 940 A1 | 9/1992 |
| EP | 0 560 052 A2 | 9/1993 |
| EP | 0 710 074 B1 | 5/1996 |
| WO | WO 95/20883 | 8/1995 |
| WO | WO 98/04149 | 2/1998 |

OTHER PUBLICATIONS

Marshall and Arbuckle, "Ice Cream", fifth edition, (1996), pp. 243, 315–319.*
Salunkhe et al, "Handbook of Fruit Science and Technology", (1995), pp. 106, 109.*

* cited by examiner

Primary Examiner—Nina Bhat
(74) Attorney, Agent, or Firm—Winston & Strawn

(57) ABSTRACT

An ice confection coating of an aqueous based sol containing a pectin and a setting agent in an amount sufficient to cause gelation of the sol. Also included are methods for preparing the coating, methods for applying the coating, and the resultant coated ice confection products.

25 Claims, No Drawings

SLOW MELTING COATING FOR ICE CONFECTIONS

TECHNICAL FIELD

The present invention relates to an aqueous based coating for ice confections, methods for preparing and applying the coating, and products containing the coating.

BACKGROUND ART

The combination of aqueous materials and ice confections is well known. Early examples of the combination include the addition of topping sauces or fruits to ice confections at the time of consumption. Added convenience is achieved if the combination is accomplished before distribution of the product. If the combination product is made in a coated format then the convenience extends to the ability to eat the dessert with one hand.

One of the oldest traditional approaches to prepare aqueous based (often fruity) coated ice cream or ice cream analogue desserts is to use freezing technology to solidify both the milky and the coating portions of an ice cream or ice cream analogue dessert. One example of freezing technology is the "shell and core" process. In the "shell and core" process an aqueous based solution, such as a fruit solution, is added to a frozen mold for a particular period of time. The mold is cooled so that a layer of solution is frozen to the mold; unfrozen material is extracted from the mold and replaced by ice cream; the mold, solution, and ice cream is then further cooled to fully freeze the product; and the mold is removed. Generally, the mold is warmed to remove the product and the removed product is then re-cooled.

The "shell and core" process has a number of disadvantages. Generally, the quality of the aqueous based coating is poor. Typically, the aqueous based coating has large ice crystals which results in a hard icy texture. Furthermore, the shape of the product is limited since it is necessary that the product can be removed from the mold. Also, the quality of the ice cream is typically poor since the ice cream must have a sufficiently low viscosity in order to be able to dose the mold. Thus, an overrun of greater than 80 percent is precluded. Finally, warming the mold to remove the product and then re-cooling the product adversely effects the quality of the final product.

Another example of freezing technology is the "dip freezing" process. In the "dip freezing" process an ice cream is dipped into an aqueous based solution, such as a fruit solution, and then freezing is used to solidify the solution onto the ice cream. The freezing must be done rapidly or the solution will drain from the ice cream. Further, the solidification of the coating by freezing depends on the limited thermal conduction of the coating. This often limits the process to applying thin coatings in any single dipping operation. Therefore, in the "dip freezing" process multiple operations may be necessary to achieve a coating with the desired thickness. Furthermore, the "dip freezing" process requires the ice cream core portion to be pre-cooled prior to dipping which raises production costs.

WO 98/04149 discloses a "dip freezing" process for preparing an ice confection comprising a mass of milk containing ice confection and a discrete element of water ice. The method involves contacting a mass of milk containing ice confection with a water ice solution having a rheometry value of more than about 1.0 to cause the ice solution to adhere to the mass of milk containing ice confection and then rapidly cooling the adhered water ice solution to −15° C. or below.

EP0710074 discloses a "dip freezing" process for preparing a two component ice confection which involves (i) cooling the surface of a mass of milk containing ice confection to a temperature of below about −15° C., preferably between −40° C. and −25° C., and more preferably below −40° C.; (ii) contacting the surface with a water ice solution having a solids content between about 15% and about 50% by weight for an amount of time sufficient to allow a layer of water ice form on the surface; and (iii) subjecting the whole to a hardening step to form the water ice layer. The hardening step involves cooling the milk containing ice confection coated with the water ice solution to the temperature used in step (i) or a lower temperature.

In general, freezing technology requires rigid control over both the temperature and the freezing time to achieve the desired thickness of the coating. The freezing time is dependent on numerous properties of the components. For example, freezing time is influenced by the respective masses of the components, the respective geometry of the components, the specific heats of the components, latent heats of solidification, and thermal conductance values of the components in both liquid and solid states. Freezing time is also influenced by temperature, contact times, and specific heats or latent heats of the heat exchange media. Examples of exchange media are ammonia, nitrogen, and air. Furthermore, heat exchange is complicated by variations in respective velocities and turbulence within the heat exchange media. Thus, a problem with freezing technology is that all of the conditions must be determined for each individual product that is to be coated. A freeze coating process that works for one product will probably not work for another product. Changing the product to be coated necessitates resetting all the conditions. Furthermore, the many variables that effect the freezing temperature and the freezing time often leads to unacceptable product variability. For example, there is the problem of streaking if the solidification process occurs too slowly. Streaking is the undesirable introduction of a line, mark, smear, or band differentiated by color, texture, or topography from its surroundings. Streaking results from liquid running down the semi-frozen solid.

Another disadvantage with freeze technology is that of melting. The coated ice cream products are not normally consumed at freezing air temperatures. As such products are refreshing they are normally consumed when the temperature is warm or hot. Under these conditions solidification of the product is reversed and the adhesion of the core and coating is reversed. This leads to a further restriction in terms of product size, which must not exceed that which could be consumed before melting causes messiness of the eat.

One approach to avoid such temporal and thermal sensitivity disadvantages is the use of alginate and setting salts as described in U.S. Pat. No. 4,985,263. U.S. Pat. No. 4,985,263 discloses a method for coating a frozen confectionary product containing calcium ions by dipping the confectionary product into a flowable aqueous medium containing an alkali metal alginate to form a coating thereon and spraying the coated product with an aqueous solution of a calcium salt. It is believed that the calcium in the confectionary product reacts with the alkali metal alginate in the flowable aqueous medium to form a gel on the surface of the confectionary product, while the calcium salt in the spray reacts with the alkali metal alginate in the coating to form a gel on the outside surface of the confectionary product.

Alginate salts, however, introduce other disadvantages. Alginates are polymer chains having a high degree of mechanical inflexibility as a result of the stiff nature of the pyranoid rings that make up the alginate polymer chain and the hindered rotation around the glycosidic linkages. This causes the alginate molecule to behave as an extended coil in solution and results in solutions having high alginate concentrations having a high viscosity. A highly viscous aqueous based coating sol is undesirable since this leads to drag that results in an uneven coating. The high viscosity therefore limits the amount of alginate that can be added to an aqueous based coating sol and thus the strength of the resulting gel is limited.

Also during storage of alginate sols depolymerization occurs which leads to a changes in viscosity of the sol. This on going change in viscosity is problematic when using alginate technology. Furthermore, this change in viscosity is enhanced when the pH is below 5. The enhanced change in viscosity is a result of the instability of the alginate chain under acidic conditions. The alginate chain depolymerizes in acidic conditions. Fruity coatings ideally have a pH lower than 5 to provide an appropriate acid taste. thus, when using alginate technology for a fruit coating the change in viscosity of the sol is even more problematic.

Another problem with alginate technology is that alginates have a very high affinity for calcium ions. The high affinity towards calcium ions leads to the rapid formation of inter-chain binding which results in the gel. This excessively rapid gelation is problematic in that it leads to the formation of a jelly-like skin or film on the coating. This jelly-like skin inhibits diffusion of calcium ions throughout the coating. Thus, the entire coating does not gel with the result being a weaker coating. Also, the natural calcium content of many fruits, such as berry fruits and lemons, is especially high. Thus, in fruit coatings the alginate often precipitates from the coating sol prior to exposing the sol to the calcium setting salt.

Another problem with alginate sols is that the alginate gel does not melt upon heating and thus flavor release is inhibited. Also alginate gels are non-adhesive, thus, there is a tendency for the coating to disengage from the ice cream.

Thus, there remains a need for improved coatings for ice creams and ice cream analogues and methods of coating such. The present invention provides such a method.

SUMMARY OF THE INVENTION

The present invention relates to an ice confection coating comprising an aqueous based sol comprising a pectin and a setting agent in an amount sufficient to cause gelation of the sol. The setting agent preferably is a source of calcium ions such as a calcium salt, or an acid that imparts gelation by acidulation of the sol. The pectin is present in an amount of between about 0.2 and 5 percent by weight of the sol. The pectin has a degree of methoxylation of between 25 and 50 percent. Preferably, the sol is a flavored sol. The sol may be flavored chocolate, fruit, toffee, fudge, caramel, butter, coffee, mint, rose, or spice. In one embodiment the gel does not melt for 4 hours at 25° C.

The invention also relates to a coated ice confection product comprising a core and this new gel coating. In one embodiment, the coating on the ice confection has a thickness of between about 2 to 3 mm. The core of the coated ice confection product can be an ice cream, or ice cream analogue, frozen yoghurt, sherbet, sorbet, ice milk, frozen custard, or a water ice. The coating of the coated ice confection product can be flavored chocolate, fruit, toffee, fudge, caramel, butter, coffee, mint, rose, or spice. In another embodiment the coated ice confection product is mounted on a stick.

The invention is further directed at a process for preparing the coated ice confection. The process involves contacting the core of ice confection with the sol and forming a gel from the sol as a coating on the core. The gel coating may be provided on the ice confection by dipping, immersion, spraying, enrobing, laminating, or co-extrusion.

In one embodiment of the invention, the sol is further contacted with the setting agent after the core has been contacted with the sol. This may be achieved by spraying the sol with a solution or suspension of the setting agent; dipping the sol into a solution, suspension, or powder of the setting agent; co-extruding or laminating the sol with a solution, suspension, or powder of the setting agent, or blowing or dusting the sol with a powder of the setting agent.

The setting agent can be calcium ions provided by a water soluble calcium salt selected from the group consisting of calcium acetate, calcium ascorbate, calcium chloride, calcium gluconate, calcium lactate, calcium propionate, and mixtures thereof. The setting agent can also be provided by a non-water soluble or sparingly water soluble calcium salt that releases calcium ions in situ by reaction with an acid, wherein the calcium salt is selected from the group consisting of calcium carbonate, calcium glycerophosphate, calcium phosphate, calcium sulfate, calcium sulfite, calcium tartrate, and mixtures thereof. When the setting agent is a non-water soluble or sparingly water soluble calcium salt the process includes the step of contacting the sol with an acid after the sol is contacted with the setting agent. The acid may be acetic acid, ascorbic acid, hydrochloric acid, gluconic acid, glucono delta lactone in water, lactic acid, or mixtures thereof.

In yet another embodiment of the invention, the setting agent is added to the sol and mixed therewith before the core is contacted with the sol. The setting agent may be a water soluble calcium salt or a non-water or sparingly water soluble calcium salt. When the setting agent is a non-water or sparingly water soluble calcium salt added the method also includes the step of adding an acid to the sol.

DETAILED DESCRIPTION OF THE PREFERRED EMBODIMENTS

The present invention relates to an aqueous based coating for ice confections, products containing the coating, and a process for preparation of the products. According to the invention a core of ice confection is coated with the aqueous based coating and the coating is allowed to gel to produce a coated ice confection product.

By ice confection is meant any aqueous based frozen product. Typically the ice confection has a sweet or semi-sweet taste. Examples of ice confections include, but are not limited to, ice cream, ice cream analogues, frozen yoghurt, sherbet, sorbet, ice milk, frozen custards, and water ices, i.e, aqueous solutions that are frozen. Ice confection products include, but not limited to, bulk products, novelties (e.g., bar and stick items), hard pack and soft serve specialties (e.g., molds, decorated items and slices), desserts, puddings, frosted items, frappes, punches, bisques, lactos, mellorenes, non-dairy items, and the like. The ice confection may contain optional ingredients such as, but not limited to, fruit, nuts, chocolate, and flour based products. By ice cream analogue is meant a product similar in structure or function to an ice cream but which may not meet the legal definition(s) of ice cream in terms of its specific composition or process of manufacture.

By aqueous based coating is meant a material with a water containing continuous phase which is used to completely or partially cover a portion of an ice confection and which may or may not have a further coating on its exterior. The aqueous based coating may also contain, for example, sweeteners, flavorings, texturants, and/or colorants, the proportions of which are determined according to taste or appearance. Examples of flavors include chocolate, toffee, fudge, caramel, butter, coffee, mint, rose, spices, and fruit flavors. Fruit flavors include, but are not limited to, strawberry, orange, lemon, lime, raspberry, cherry, grape, blueberry.

The current invention is based on the discovery that non-amidated pectin may be used in a coating for ice confections. The coating of the present invention is an aqueous based coating that contains a non-amidated pectin in an amount of about 0.1 to 10 percent by weight of the coating, preferably about 0.2 to 5 percent by weight of the coating. The pectin has a degree of methoxylation between 25 and 50, preferably between about 30 to 40. By non-amidated pectin is meant a pectin which has not had any de-esterification treatment with ammonia that would convert ester groups to primary amide groups.

The pectins are suspended in the aqueous based coating to form a sol by mixing the pectin with the aqueous coating solution at high speed. Preferably the pectin is added to an aqueous solution at a temperature greater than 40° C., preferably greater than 75° C. Other ingredients of the aqueous based sol may be added either before or after the pectin is added. By sol is meant a liquid colloid that does not maintain its own shape but maintains the shape of the container.

Pectins are partially methoxylated poly($\alpha$1–4D-galacturonic acids). Pectins are naturally occurring cell wall polysaccharides and can be derived from a variety of fruits and vegetables. Pectins are classified as either being LM (low methoxy) or HM (high methoxy) pectins according to whether the degree of methoxylation is lower or higher than 50. Methoxylation refers to methoxy groups replacing the hydroxy groups present on the galacturonic acid molecules. A degree of methoxylation of 50 means that on average 50 percent of the galacturonic acid units are in the methyl ester form. The degree of methoxylation can be measured by a variety of methods. In one method the total galacturonic acid content is determined by decarboxylation and measuring of the carbon dioxide produced and the amount of methoxyl groups are determined by saponification and measuring the amount of methanol produced with gas chromatography. Application of stoichiometry is then used to determine the degree of methoxylation. The degree of methoxylation is an average value as commercial pectins are not homogenous with respect to their constituent polymers or homogenous within each polymer.

The pectin chain consists predominately of six membered pyranose rings in their most stable chair conformation. The pyranose rings, however, can adopt other conformations, such as skew and boat conformations, under higher energy conditions. The pyranose rings are connected by glycosidic linkages. The polysaccharide chain tends to adopt a coiled structure in the sol.

The pectin chain also contains "kinking" residues interspersed at low percentages in the polymer chain. The "kinking" residues are predominately $\beta$-L-rhamnopyranosy residues containing neutral sugar side chains of arabinans, galactans, and arabinogalactans. In the absence of "kinking" residues the coil of the pectin chain would exist predominately as a grossly linear structure, i.e., as a helix extending in a straight line. The presence of "kinking" structures, however, causes the coiled chain to bend and depart from being linear. The presence of acetylated galacturonic acids ("hairy" regions) or a change in the methoxylation pattern can also impart bends in the coiled chain such that the coiled chain departs from being linear.

This heterogeneity and flexibility of the pectin molecule makes it much less stiff than the alginate molecule. This heterogeneity and flexibility leads to different solution characteristics of pectins compared to alginates. For example, with the pectins of the present invention aqueous sols having relatively high concentrations, of up to 10 percent for example, may easily be prepared and do not exhibit excessive viscosity even at low temperatures, i.e., temperatures less than 30° C. As a result of the low viscosity of the pectin sols of the present invention they do not exhibit excessive drag and, thus, products coated with the pectin sols of the present invention have an even coating. Furthermore, the relatively high concentration of pectin which may be incorporated into the sol leads to the formation of a strong gel having good structural integrity in the final product.

In the regions of the polymer chains that are smooth, i.e., not "kinky" or "hairy," there is a degree of association between different helices. The binding forces between the chains include hydrogen bonds and hydrophobic interactions between methoxy groups. These interactions lead to the cohesiveness of the pectin molecules. By cohesiveness is meant the intermolecular attraction by which like molecules are held together. Both of the forces leading to association of pectin chains are promoted by low water activity and by low pH which reduces electrostatic repulsion between chains. Therefore, unlike alginate sols, the pectin sol has its cohesiveness enhanced by the presence of sugars and acidity. In fact, the cohesiveness of the sols of the present invention are such that single rather than multiple applications of coating are entirely practical.

The aqueous based coating of the present invention is contacted with a core of frozen ice confection. The core of ice confection can also contain additional ingredients such as nuts, pieces of fruit, candy, and the like. The core can be, for example, a bar supported on a stick.

Methods by which the core of ice confection is contacted with the coating sol include, but are not limited to, immersion, spraying, enrobing, layering, lamination, and co-extrusion. These methods are well known to those of ordinary skill in the art and need not be discussed here. The preferred method of applying the coating is by dipping. The core of ice confection is dipped in the sol for about 0.5 to 5 seconds, preferably for about 1 to 3 seconds. When the core of ice confection is dipped the ideal pick-up of the sol is enough to provide a coating of about 1 to 4 mm in thickness, preferably about a 2–3 mm in thickness. The temperature of the coating when it is applied to the ice confection is between about 1° C. and 30° C. and preferably between about 5° C. and 20° C. The temperature of the ice confection being coated is determined mainly by the need to retain its shape. According to Arbuckle, in "Ice Cream," $4^{th}$ edition, AVI Publishing, (1986), page 303 it is typical to harden fancy extruded ice cream to between −43° C. and −46° C. Such temperatures are quite acceptable according to the present invention. If shape is less of a concern, however, as in enrobing on a flat surface, for example, then higher ice confection temperatures of between about −5° C. to −10° C. are feasible. After the coating is applied the coating is allowed to solidify by a gelation mechanism. By gelation is meant that the sol becomes a gel. By gel is meant an aqueous colloid that maintains its own shape.

Gelation of the coating of the present invention does not occur by a freeze coating process. Thus, the coatings of the present invention are stable over a wide range of temperatures and unlike coatings applied by freeze technology they do not melt. In fact, products coated with the coating of the present invention did not exhibit any melting of the coating within four hours at 25° C.

The gelation of the coating is achieved by the use of a setting agent that is added to the sol in an amount sufficient to cause gelation of the pectin. The most preferred agent is one that contains calcium ions provided by a calcium compound such as a calcium salt. Other setting agents can also be used. For example, setting agents containing magnesium ions, such as magnesium salts, can be used. For certain pectins acidulation is effective to cause gelation.

Without wishing to be bound by theory it is believed that the mechanism for gelation of pectin sols is predominately the result of the agent bonding with the pectin. For example, calcium binding is the dominant gelation mechanism for low methoxy pectins. For high methoxy pectins, the dominant gelation mechanism is by acidulation in the presence of high levels of soluble solids. All pectins, however, exhibit both gelation mechanisms to some degree. By acidulation is meant to make or become more acidic. By calcium binding is meant that calcium ions become bonded to junction zones that are created by the association of pectin chains in which carboxyl groups on each chain are bonded by divalent calcium ions. Binding can also occur with divalent magnesium ions.

As noted above there is a degree of association between different pectin polymer chains in the regions of the polymer chains that are smooth (i.e., not "hairy") and straight (i.e., not "kinky"). The associated chains are aligned so that di-axial links between pyranose rings creates spaces or junction zones between pairs of chains. These junction zones can accommodate calcium ions in an arrangement similar to eggs in a carton. When the junction zones of the pectin chain are occupied with calcium ions the interaction between chains is strengthened. The pectin sol becomes a gel since the junction zone portion is no longer exposed to the solution while the amorphous part remains exposed to the solution. As noted above, the interaction between chains occurs between regions that are smooth. If the smooth regions of the pectin chain are too long, such that the interaction between the polymer chains takes place over a long length, the resulting loss of hydration that occurs when the junction zones accommodate calcium ions will cause the pectin chain to precipitate rather than gel. The presence of "kinking" residues and other structural features that cause the pectin chain to depart from being linear provide limit stops or blockers that prevent long regions of interaction between different polymer chains so that precipitation does not occur when the pectin sol is exposed to calcium ions.

Preferably, calcium ions are available in the ice confection. Calcium ions are readily available in ice confections wherein the core is milk based or calcium may be added to a non-milk based core. Thus, when the pectin sol comes in contact with the ice confection the calcium ions in the ice confection bond to the junction zones of the pectin molecule and the coating gels onto the ice confection. The pectins of the present invention show excellent adhesiveness to ice confections containing calcium. By adhesiveness is meant the molecular interaction between dissimilar substances. Adhesion of the coating to the ice confection occurs by a gelation mechanism rather than by freezing. Indeed, the formation of the gel was not effected even when the temperature of the coating sol was elevated to 30° C.

Once the coating has been applied to the ice confection addition of a solution of a setting salt to the coating completes gelation of the exterior surface of the coating. The addition of a solution of a setting salt to the coating may be accomplished by spray or dipping, for example. Preferably the setting salt is a calcium salt. The speed of gelation is controlled so as to permit the permeation of calcium into the coating before the exterior of the gel fully hardens. This avoids "casehardening" or the generation of an impermeable skin. The speed of gelation can be controlled by adjusting various parameters. These parameters include the concentration of pectins, the degree of methoxylation of the pectins, the acidity of the coating, and the level and type of sugars in the coating. The acidity of the coating may be from about pH 1 to pH 8, preferably pH 2 to pH 6. The type of sugar used in the coating may be, but is not limited to monosaccharides, disaccharides or oligosaccharides. Preferred sugars are glucose, fructose, invert sugar, sucrose, maltose, or corn syrups of various dextrose equivalents. The level of sugars present in the coating is from about 5 to 65 percent by weight of the coating, preferably from about 10 to 50 percent by weight of the coating. Sugar substitutes such as polyols may also be used.

The calcium salt can also be added to the pectin sol prior to contacting the ice confection with the sol. In this case it is preferable to add a soluble calcium salt immediately prior to contacting the ice confection with the sol. Preferably the calcium salt is mixed into the sol, such as with a static mixer, before contacting the ice confection with the sol. In a similar manner, an insoluble calcium salt may be converted in situ into a soluble calcium salt, for example by adding acid(s) immediately prior to contacting the ice confection with the sol. By varying the amount of calcium salt added to the sol the time required for the sol to gel can be varied. The calcium salt is preferably added to the sol in an amount containing between 20 and 120 mg of calcium per gram of pectin in the sol, preferably between 30 and 70 mg of calcium per gram of pectin in the sol. The calcium content of the chosen salt may be determined from basic stoichiometry. For example, calcium lactate anhydrous has a molecular weight of 218.22 g/mole and includes one atom of calcium with an atomic weight of 40.08 g/mole such that calcium lactate anhydrous contains 18.37 percent by weight of calcium.

The calcium salt can be any calcium salt or mixture of calcium salts. Examples of calcium salts include, but are not limited to, the water soluble salts such as calcium acetate, calcium ascorbate, calcium chloride, calcium gluconate, calcium lactate, and calcium propionate or the non-water or sparingly water soluble salts such as calcium carbonate, calcium glycerophosphate, calcium sulfate, calcium sulfite, and calcium tartrate. The non-water or sparingly water soluble calcium salts release calcium ions in situ by reaction with an added acid such as acetic acid, ascorbic acid, hydrochloric acid, gluconic acid (or glucono delta lactone in water), or lactic acid. Preferably the calcium salt is calcium lactate. The calcium salt may be applied by spraying or sprinkling a solution of the salt on the coating or by sprinkling a suspension or powder of the salt on the coating. If the salt is applied as a solution the concentration of salt in the solution is between about 1 to 15 percent by weight of the solution and, preferably, between about 2 to 8 percent by weight of the solution. Preferably, the solution is an aqueous solution.

Appropriate selection of the parameters leads to a strong coating having excellent adhesion to the ice confection. The coating is, resistant to temperature increases and physical forces associated with storage and distribution of such products. According to Arbuckle in "Ice Cream," 4th Edition, AVI Publishing, (1986), page 264, it is a common practice to immerse ice cream products in liquid nitrogen for hardening such that the outer temperature of the product can reach −155° C. or less. The described gel coating survives such a procedure. Yet the described gel coating breaks down in the mouth due to the shear forces from chewing. The pectin gels of the present invention cannot be melted at ambient temperature. Therefore, the coating has the added benefit of not dripping or running during consumption. The product also exhibits excellent flavor release and mouth feel. The pectin coatings of the present invention are particularly useful for fruit coatings and have a texture and mouth feel similar to real fruit. This is because pectins are the natural gelling agent in fruit.

EXAMPLES

The invention is further defined by reference to the following examples describing in detail the methods of the present invention. The examples are representative, and should not be construed to limit the scope of the invention in any way.

Example 1

A coating was prepared according to the formulation provided in table 1:

TABLE 1

| Ingredient | Quantity (percent by weight) |
| --- | --- |
| Water (soft)* | 56.6 |
| Corn Syrup, 36DE, 80TS | 7 |
| Sugar | 15.5 |
| Pectin, 35DM | 0.45 |
| Tapioca Starch | 0.15 |
| Strawberry Puree Concentrate, 28TS | 20 |
| Citric Acid Solution, 50TS | 0.3 |
| Flavor | q.s |
| Color | q.s |

*By soft water is meant a water having less than 3.5 grains of hardness per gallon, which is equivalent to 60 ppm (mg/Kg) of hardness expressed as calcium ions.

The coating was prepared according to the following procedure:
1. A dry blend was prepared from the starch, pectin, and sugar.
2. Water was heated to 77° C.
3. Water was agitated at high speed using a liquidizer.
4. The dry mix was added in one shot.
5. The corn syrup, puree, and color were added.
6. Mixing was continued for 3 minutes.
7. The mix was pasteurized and cooled to 4.5° C.
8. The citric acid and flavor were incorporated.

The coating was applied to ice cream bars by dipping the ice cream bars into the coating for a period of 1 second. After the ice cream bars were removed from the coating they were sprayed with an 8 percent solution of calcium lactate. The ice cream bars were held for 15 seconds at ambient temperature (25° C.) to permit completion of the gelation reaction. The gel coating on the ice cream bars was firm to the touch.

Some of the ice cream bars were held for 4 hours at ambient temperature (25° C.) and retained their shape without any melting of the coating. Other ice cream bars were subsequently frozen to −40° C., held at this temperature for 3 months, and then thawed. After thawing these bars were also held for 4 hours at ambient temperature (25° C.). These bars also retained their shape without any melting of the coating. Still other bars were submitted to a heat shock regimen in which the temperature was cycled from −30° C. to −12° C., with 2 complete cycles per day, for a duration of 30 days. No changes were noticeable in the coating.

Example 2

Samples were prepared according to the method of example 1 except that the level of tapioca starch was adjusted to modify the helipath viscosity of the coating (at 4.5° C.) using a Brookfield HAT viscometer and a type "A" T-bar at 10 rpm (commercially available from Brookfield Engineering Laboratories of Stoughton, Mass.). The level of tapioca starch, the viscosity of the coating, and the weight of coating picked up is provided below in the Table 2.

TABLE 2

| Level of Tapioca Starch (percent by weight) | Coating Viscosity (cps) | Amount of Coating Picked Up (g) |
| --- | --- | --- |
| 0.0 | 4,400 | 28 |
| 0.2 | 6,370 | 31 |
| 0.4 | 8,000 | 33 |

The small change in the weight of the coating picked up compared to the large change in viscosity indicated that viscosity has only a minor influence on the amount of coating picked up.

Gelation driven by calcium from the ice core, which reacts with the pectin, is considered to be the key mechanism. Dissection of the bars immediately after coating (before spraying) demonstrated that the onset of gelation to be at the region of contact with the ice cream core.

Example 3

Samples were prepared according to the method of example 1 except that the level of pectin was varied. Gelation time was determined as the time for the coating to become solid at ambient temperature (25° C.). The level of pectin, the weight of coating picked up, and the gelation time is provided below in Table 3.

TABLE 3

| Level of Pectin (percent by weight) | Amount of Coating Picked Up (g) | Gelation Time (s) |
| --- | --- | --- |
| 0.4 | 24.3 | 15 |
| 1.0 | 28.0 | 10 |
| 1.6 | 34.1 | 6 |

This demonstrates that the gelation time is a function of the amount of pectin in the coating.

Example 4

Samples were prepared according to example 1 except that a heat gun was used to increase the temperature. A hot air blast was applied from a distance of 8 inches for periods of 20–30 seconds with the time starting at the initiation of dipping. Surface temperature of the ice cream varied between −0.5° C. and +0.5° C. immediately before dipping. Surface temperatures were determined using an infrared surface temperature thermometer. The duration of heat application, the final temperature of the coating surface, and the gelation time is provided below in Table 4.

TABLE 4

| Duration of heat Application (s) | Final Temperature of Coating Surface (° C.) | Gelation Time (s) |
|---|---|---|
| 20 | 7 | 10 |
| 25 | 9 | 6 |
| 30 | 12 | 4 |

This showed that the adhesion and solidification of the coating was not a freeze coating process.

Example 5

Samples were prepared according to example 1, except that the type of pectin was modified. Table 5 provides the nature of the coating for pectins having different degrees of methoxylation (DM).

TABLE 5

| Pectin Type (DM) | Nature of Coating |
|---|---|
| 4 | Localized pre-gelatinized lumps |
| 10 | Tough gel but variable texture |
| 25 | Very stiff gel |
| 35 | Stiff gel |
| 50 | Firm but softer gel than 35DM |
| 60 | Thick, slimy gel |
| 72 | Highly viscous, but not gelled |

This shows that the best coating is obtained with pectins having a degree of methoxylation between about 25 and 50.

Example 6

A coating was prepared according to the method of claim 1 except that the mix was cooled to 25° C. A static mixer was used to mix the coating with the calcium setting salt. Duration in the mixer was 3 seconds. The resultant fluid was applied to ice cream bars by either enrobing, piping, or spraying. For spraying applications the set time of the gel was extended by about 5 seconds compared to the other methods. Without wishing to be bound by theory it is believed that this delay is necessary due to extra shear forces exerted on the sol during a spraying operation that inhibits the natural process of molecular orientation that precedes the formation of junction zones.

By changing the ratios of base coating and setting salt, it was possible to vary the setting times between 5 seconds and 1 minute. Table 6 provides the gel setting time at 25° C. as a function of calcium lactate in the coating solution

TABLE 6

| Calcium lactate in coating solution (%) | 0.5 | 0.4 | 0.3 | 0.2 |
|---|---|---|---|---|
| Gel setting time at 25° C. (seconds after enrobing) | 5 | 18 | 36 | 61 |

Example 7

A coating was prepared according to the method of claim 1 except that other calcium based setting salts were used. Calcium chloride and calcium gluconate were used in place of calcium lactate. At equivalent concentrations of calcium no difference in the gelation process or in the physical properties of the coated product were observed when calcium chloride or calcium gluconate were used.

What is claimed is:

1. An ice confection gel coating comprising a gelled pectin having structural integrity at 25° C. that is provided by the reaction product at no greater than 30° C. of an aqueous based sol of a pectin and a setting agent which is present in an amount sufficient to cause gelation of the sol.

2. The coating of claim 1, wherein the amount of pectin is between about 0.2 and 5 percent by weight of the sol and the pectin has a degree of methoxylation of between 25 and 50 percent.

3. The coating of claim 1 wherein the sol is flavored and the setting agent is a salt comprising calcium ions.

4. The coating of claim 3 wherein the sol is flavored chocolate, fruit, toffee, fudge, caramel, butter, coffee, mint, rose, or spice.

5. The coating of claim 3 wherein the calcium ions are provided by a water soluble calcium salt selected from the group consisting of calcium acetate, calcium ascorbate, calcium chloride, calcium gluconate, calcium lactate, calcium propionate, and mixtures thereof.

6. The coating of claim 1 which does not melt for up to 4 hours at 25° C.

7. A coated ice confection product comprising an ice confection core and the gelled pectin coating of claim 1.

8. The product of claim 7 wherein the coating has a thickness of between about 2 to 3 mm.

9. The product of claim 7, wherein the core is an ice cream, ice cream analogue, frozen yoghurt, sherbet, sorbet, ice milk, frozen custard, or water ice.

10. The product of claim 7, wherein the coating is a flavored chocolate, fruit, toffee, fudge, caramel, butter, coffee, mint, rose, or spice.

11. The product of claim 7, mounted on a stick.

12. The product of claim 7 wherein the coating is made by mixing the setting agent with the sol before the core is contacted with the sol.

13. The product of claim 12 wherein the setting agent comprises calcium ions provided by a water soluble calcium salt selected from the group consisting of calcium acetate, calcium ascorbate, calcium chloride, calcium gluconate, calcium lactate, calcium propionate, and mixtures thereof.

14. The product of claim 12, wherein the gel composition further comprises an acid, wherein the setting agent comprises calcium ions provided by a non-water soluble or sparingly water soluble calcium salt that releases calcium ions in situ by reaction with an acid, wherein the calcium salt is selected from the group consisting of calcium carbonate, calcium glycerophosphate, calcium phosphate, calcium sulfate, calcium sulfite, calcium tartrate, and mixtures thereof, and wherein the acid is selected from the group consisting of acetic acid, ascorbic acid, hydrochloric acid, gluconic acid, glucono delta lactone in water, lactic acid, or mixtures thereof.

15. The product of claim 7 wherein the core contains nuts, fruit pieces or candy.

16. The product of claim 7 wherein the core is milk based and supplies calcium ions as the setting agent for the pectin gel.

17. The product of claim 7 wherein the coating enrobes the entire core to prevent dripping or running of the core during consumption.

18. The product of claim 1, wherein the gelled coating is formed by dipping, immersion, spraying, enrobing, laminating, or co-extrusion of the sol on the core.

19. The product of claim 1, wherein the reaction product is formed while the core is contacted with the sol.

20. The product of claim 19 wherein the setting agent comprises calcium ions provided by a water soluble calcium salt selected from the group consisting of calcium acetate, calcium ascorbate, calcium chloride, calcium gluconate, calcium lactate, calcium propionate, and mixtures thereof.

21. The product of claim 20 wherein the calcium ions are provided by a non-water soluble or sparingly water soluble calcium salt that releases calcium ions in situ by reaction with an acid, wherein the calcium salt is selected from the group consisting of calcium carbonate, calcium glycerophosphate, calcium phosphate, calcium sulfate, calcium sulfite, calcium tartrate, and mixtures thereof.

22. The product of claim 21, wherein the gel coating further comprises an acid selected from the group consisting of acetic acid, ascorbic acid, hydrochloric acid, gluconic acid, glucono delta lactone in water, lactic acid, or mixtures thereof after the sol is contacted with the setting agent.

23. The product of claim 19, wherein the sol is contacted with the setting agent by spraying the sol with a solution or suspension of the setting agent; dipping or immersing the sol into a solution, suspension, or powder of the setting agent; co-extruding or laminating the sol with a solution, suspension, or powder of the setting agent, or blowing or dusting the sol with a powder of the setting agent.

24. The coating of claim 1, wherein the gelled pectin is solid-in-liquid colloid that maintains its shape.

25. The coating of claim 1 wherein the pectin sol and setting agent are mixed to facilitate pectin gelation throughout the coating.

* * * * *

UNITED STATES PATENT AND TRADEMARK OFFICE
CERTIFICATE OF CORRECTION

PATENT NO.    : 6,379,724 B1
DATED         : April 30, 2002
INVENTOR(S)   : Best et al.

It is certified that error appears in the above-identified patent and that said Letters Patent is hereby corrected as shown below:

<u>Title page,</u>
Item [56], References Cited, "OTHER PUBLICATIONS", insert the following publication: -- Arbuckle, "Ice Cream", third edition, pp. 292-302 (1977) --.

<u>Column 14,</u>
Line 10, after "wherein the gelled pectin is", insert -- a --.

Signed and Sealed this

Tenth Day of September, 2002

*Attest:*

*Attesting Officer*

JAMES E. ROGAN
*Director of the United States Patent and Trademark Office*